United States Patent
Zhang et al.

(10) Patent No.: US 10,353,993 B2
(45) Date of Patent: Jul. 16, 2019

(54) PHASED GENERATION AND DELIVERY OF STRUCTURED DOCUMENTS

(71) Applicant: Facebook, Inc., Menlo Park, CA (US)

(72) Inventors: Zixiao Zhang, Stanford, CA (US); Changhao Jiang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 125 days.

(21) Appl. No.: 15/174,297

(22) Filed: Jun. 6, 2016

(65) Prior Publication Data

US 2016/0314101 A1    Oct. 27, 2016

Related U.S. Application Data

(63) Continuation of application No. 14/300,075, filed on Jun. 9, 2014, now Pat. No. 9,361,281, which is a
(Continued)

(51) Int. Cl.
G06F 17/20 (2006.01)
G06F 17/22 (2006.01)
G06F 16/957 (2019.01)

(52) U.S. Cl.
CPC ...... *G06F 17/2247* (2013.01); *G06F 16/9577* (2019.01); *G06F 17/227* (2013.01)

(58) Field of Classification Search
CPC .............................. G06F 17/24; G06F 17/2247
See application file for complete search history.

(56) References Cited

U.S. PATENT DOCUMENTS 7,376,653 B2 * 5/2008 Hart, III ................. H04L 67/06
                                                                707/957
7,594,001 B1    9/2009 Ebbo et al.
(Continued)

FOREIGN PATENT DOCUMENTS

JP    2004504681 A    2/2004
JP    2005251137 A    9/2005
(Continued)

OTHER PUBLICATIONS

Notice of Acceptance received from the Australian IP Government, for Australian Patent Application No. 2014223495, dated Jun. 29, 2017.
(Continued)

*Primary Examiner* — Keith D Bloomquist
(74) *Attorney, Agent, or Firm* — Baker Botts L.L.P.

(57) ABSTRACT

In one embodiment, a method includes receiving a request for a web page; sending a first response portion for generating the requested web page to a client computing device that includes a structured document place-holder code segments and executable code for implementing a page-assembling process; generating second response portions each for generating a corresponding portion of the requested web page that each include a call to a function of the page-assembling process; determining relative priorities of the second response portions; sending the second response portions to the client computing device in an order based on the determined relative priorities; and wherein the page-assembling process is configured to insert, or cause to be inserted, at a location determined by a corresponding one of the place-holder code segments, the second portions of content into a model representation of the structured document generated by a client rendering application.

20 Claims, 4 Drawing Sheets

Related U.S. Application Data continuation of application No. 12/754,549, filed on Apr. 5, 2010, now Pat. No. 8,751,925.

(56) References Cited

U.S. PATENT DOCUMENTS

| | | | |
|---|---|---|---|
| 8,291,312 B1 | 10/2012 | Zhou | |
| 2002/0073206 A1 | 6/2002 | Jawahar et al. | |
| 2004/0177217 A1 | 9/2004 | Roohparvar | |
| 2005/0050067 A1 | 3/2005 | Sollicito et al. | |
| 2006/0080602 A1* | 4/2006 | Lahdensivu | G06F 17/212 715/209 |
| 2008/0133722 A1* | 6/2008 | Ramasundaram | G06F 17/30893 709/222 |
| 2008/0228772 A1 | 9/2008 | Plamondon | |
| 2009/0292458 A1* | 11/2009 | Nakamura | G01C 21/32 701/532 |
| 2011/0022984 A1* | 1/2011 | van der Meulen | G06F 9/44526 715/830 |
| 2011/0055683 A1 | 3/2011 | Jiang | |
| 2013/0117252 A1 | 5/2013 | Samaddar et al. | |

FOREIGN PATENT DOCUMENTS

| | | |
|---|---|---|
| JP | 2008070949 A | 3/2008 |
| JP | 2010518533 A | 5/2010 |
| KR | 20100057505 A | 5/2010 |

OTHER PUBLICATIONS

Notice of Allowance received from the Korean Patent Office, for Korean Patent Application No. 10-2015-7027002, dated Jun. 29, 2017.

JP OA received from JPO for Patent Application No. 2017-114072. (with English Translation), Aug. 7, 2018.

JP OA received from JPO for Patent Application No. 2017-114072. (with English Translation), Nov. 27, 2018.

Israeli Office Action received from the Israeli Patent Office, for Israeli Patent Application No. 240800, dated Jul. 26, 2017.

International Search Report and Written Opinion for PCT/US2014/018827, dated Jun. 13, 2014.

* cited by examiner

PHASED GENERATION AND DELIVERY OF STRUCTURED DOCUMENTS

PRIORITY

This application is a continuation under 35 U.S.C. § 120 of U.S. patent application Ser. No. 14/300,075, filed 9 Jun. 2014, which is a continuation under 35 U.S.C. § 120 of U.S. patent application Ser. No. 12/754,549, filed 5 Apr. 2010, issued as U.S. Pat. No. 8,751,925 on 10 Jun. 2014, both of which are incorporated herein by reference.

TECHNICAL FIELD

The present disclosure relates generally to serving structured documents (such as web pages) to remote clients and, more particularly, to using phased generation and delivery of structured documents for use in efficiently rendering structured documents and decreasing perceived rendering time.

BACKGROUND

Conventionally, when a request for a web page or other structured document transmitted by a client device is received by a server or computing system hosting the web page, the hosting system typically generates a base web page in the form of an Hyper Text Markup Language (HTML), Extensible Markup Language (XML), or other web browser-supported structured document. The generated structured document is then transmitted in a response to the requesting client via a Hypertext Transfer Protocol (HTTP) or other suitable connection for rendering at the client device. The structured document may include one or more resources (e.g. a JavaScript script or resource, a Cascading Style Sheet (CSS) resource, an image, a video, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource to the client requesting the web page. Typically, upon receipt of the response, the web browser or other client application running at the client device then constructs a document object model (DOM) representation of the received structured document and requests the resource(s) (which may be at one or more other external locations) embedded in the document.

DESCRIPTION OF EXAMPLE EMBODIMENTS

Figure 1:
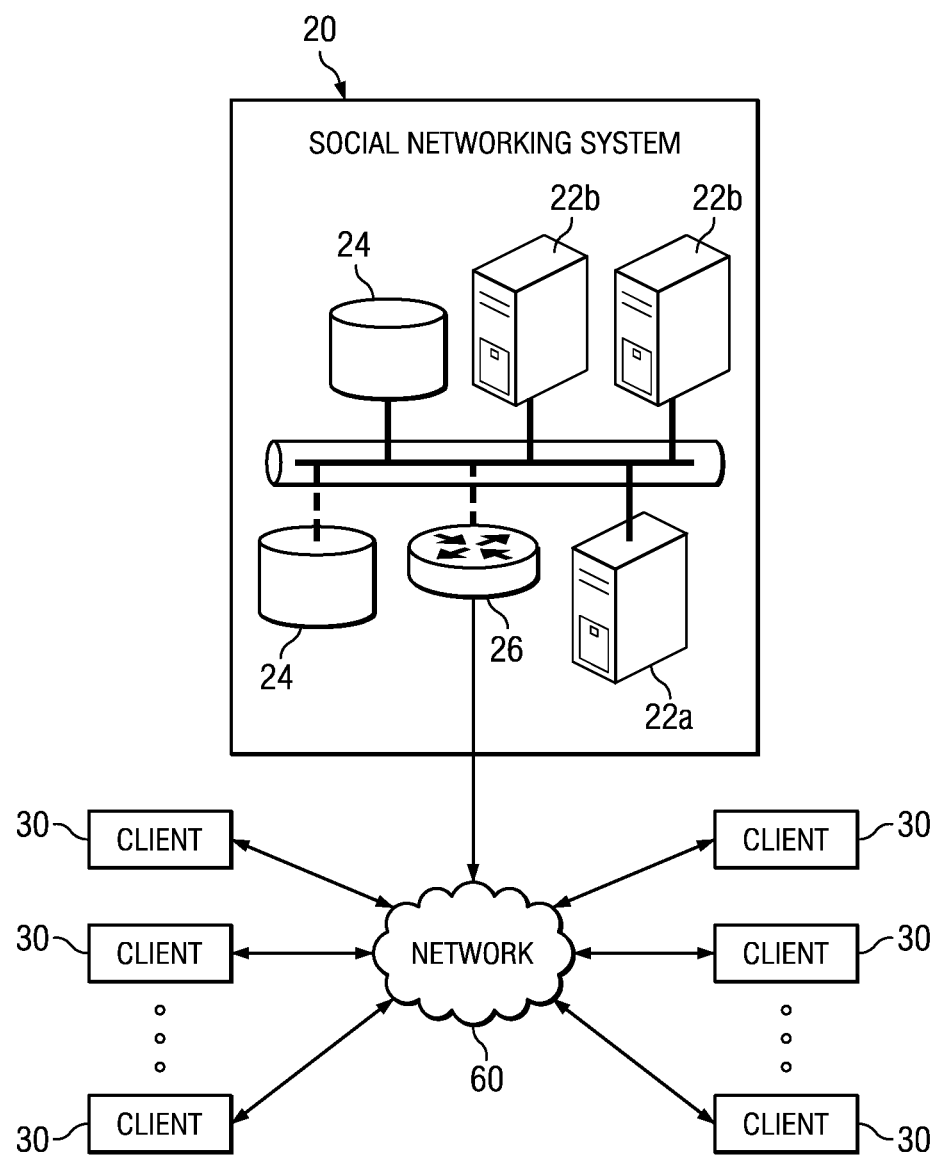
FIG. 1 illustrates an example network environment.

The present disclosure relates generally to serving structured documents to remote clients and, more particularly, to using phased generation and delivery of structured documents for use in efficiently rendering structured documents and decreasing perceived rendering time. Particular embodiments relate to a phased approach to serving a requested structured document, such as a web page. In particular embodiments, when a request for a particular web page is received by a host server or system, the host generates and transmits to the requesting client an initial response or initial response portion that includes a "base" or "skeletal" structured document including markup language code for rendering one or more place-holders, as well as executable code that when received by the client, implements a client-side page-assembling process. After the initial response is received by the client, a client-side document-rendering application renders the base structured document, which generally includes generating a model representation of the base structured document including the place-holders. In particular embodiments, the initial response further includes one or more resources or one or more references to resources to be downloaded and executed by the document-rendering application.

In particular embodiments, after generating and transmitting the initial response, the host then launches one or more server-side page- or subpage-generating processes that each generate a respective secondary portion of the requested web page including markup language code (e.g., HTML), one or more second resources, or one or more references to second resources to be downloaded. Once a page-generating process completes a secondary portion of the requested web page, the secondary portion may then be transmitted to the client in a secondary response or secondary response portion. In an alternate embodiment, the host may generate each secondary portion sequentially in-process, which may generally not involve launching one or more other page-generating processes. In particular embodiments, after each of one or more secondary responses are received, the client-side page-assembling process may dynamically insert, or cause the client-side document-rendering application to insert, the secondary portion of the requested web page received in the secondary response, into the model representation at a corresponding place-holder of the model representation for rendering by the document-rendering application. In this way, the client may render the base structured document and at least start downloading the resources identified in the initial response, such as embedded scripts and style sheets, while the rest of the web page (included in the remaining one or more secondary portions) is being generated by the host, thereby potentially reducing the time required to render the web page at the client.

In various example embodiments, one or more described web pages may be associated with a social networking system. However, alternate embodiments may generally have application to the retrieval and rendering of structured documents hosted by any type of network addressable resource or web site. Additionally, as used herein, a "user" may be an individual, a group, or an entity (such as a business or third party application). Furthermore, as used herein, "or" may imply "and" as well as "or;" that is, "or" does not necessarily preclude "and," unless explicitly stated or implicitly implied.

Particular embodiments may operate in a wide area network environment, such as the Internet, including multiple network addressable systems. FIG. 1 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising social networking system 20 and one or more client devices 30. Client devices 30 are operably connected to the network environment via a network service provider, a wireless carrier, or any other suitable means.

In one example embodiment, social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, which maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships or connections between different users. The relationship information may indicate users who have similar or common work experience, group memberships, hobbies, or educational history. A user profile may also include privacy settings governing access to the user's information is to other users.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network. In particular implementations, the client applications allow a user of client device 30 to enter addresses of specific network resources to be retrieved, such as resources hosted by social networking system 20. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

More particularly, HTML enables developers to embed objects or resources, including web applications, images, or videos, within a structured document such as a web page. Generally, an HTML structured document is written in the form of HTML elements that consist of tags (surrounded by angle brackets) within the structured document content, which act as indicators to a web browser rendering the structured document as to how the document is to be interpreted by the web browser and ultimately presented on a user's display. By way of example, HTML elements may represent headings, paragraphs, hypertext links, embedded media, and a variety of other structures. HTML can include or can load scripts in languages such as JavaScript, which affect the behavior of HTML processors such as conventional web browsers, and Cascading Style Sheets (CSS), which define the appearance and layout of text and other content. HTML elements are the basic components for HTML and have two basis properties: attributes and content. Each element's attribute and content have certain restrictions that must be followed for an HTML element to be considered valid. An HTML element usually has a start tag (e.g., <element-name>) and an end tag (e.g., </element-name>). The element's attributes are contained in the start tag and content is located between the tags (e.g., <element-name attribute="value">Content</element-name>).

By way of example, HTML elements include structural elements (e.g., describing the purpose of text or other content), presentational elements (e.g., describing the appearance of text or other content regardless of its function), and Hypertext elements (e.g., making part of a document into a link to another document). Most elements can take any of several common attributes. By way of example, the id attribute provides a document-wide unique identifier for an element, the class attribute provides a way of classifying similar elements, and the title attribute is used to attach subtextual explanation to an element. HTML also defines several data types for element content, such as script data and stylesheet data, and numerous types for attribute values, including, by way of example, IDs, names, URIs or URLs, numbers, units of length, languages, media descriptors, colors, character encodings, dates and times, etc.

Document structure elements include the root element (defined by the starting and ending tags <html> and </html>, respectively), head elements (defined by the starting and ending tags <head> and </head>, respectively), and body elements (defined by the starting and ending tags <body> and </body>, respectively). The root element tags <html> and </html> delimit the beginning and end of an HTML document, respectively. All other HTML elements of a given HTML document are included within the root element. The head element tags <head> and </head> generally define a container for processing information and metadata for an HTML document. Example document head elements found within the head element container include, by way of example and not by way of limitation, the base element (defined by starting and ending tags <base> and </base>, respectively), which specifies a base uniform resource locator (URL) for all relative href and other links in the HTML document, the link element (defined by starting and ending tags <link> and </link>, respectively), which specifies links to other documents (e.g., for external CSS files), the meta element (defined by starting and ending tags <meta> and </meta>, respectively), which can be used to specify additional metadata about an HTML document, the object element (defined by starting and ending tags <object> and </object>, respectively), used for including generic objects within the document header, the script element (defined by starting and ending tags <script> and </script>, respectively), which can act as a container for script instructions (e.g., JavaScript) or a link to an external script with the src (source) attribute, the style element (defined by starting and ending tags <style> and </style>, respectively), which specifies a style for the document and which can act as a container for style instructions (e.g., for inlined CSS rules), and the title element (defined by starting and ending tags <title> and </title>, respectively), which defines a document title.

The body element <body> represents a container for the displayable content of an HTML document. Example body elements include, by way of example and not by way of limitation, block elements (e.g., basic text and list elements, among others), inline elements (e.g., anchor and phrase elements), and image and object elements. A script element positioned within the body element may be used to place a script in the document (e.g., the script element may contain instructions to dynamically generate block or inline content). The image element (defined by starting and ending tags <img> and </img>, respectively) may be used to insert an image into the document. By way of example, the image element may include an src attribute that specifies a URL where the image is located. The object element (defined by starting and ending tags <object> and </object>, respectively) may be used to insert an object into the document of the type specified in an included type attribute. Another frequently used HTML element is the frameset element, which may be used as an alternative to the body element.

Generally, a web application is an application that may be accessed via a web browser or other client application over a network, or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications often require access to additional resources associated with other applications.

Social networking system 20 may include a multitude of features with which users at remote clients 30 may interact during user sessions. In particular embodiments, these features may be implemented as web applications and may utilize JavaScript and CSS resources requested from servers 22 as well as other external servers or data stores. The web applications or resources may be embedded in various web pages served to remote clients, such as in frames or iFrames, sections or "divs" and the like. In particular embodiments, the social networking system 20 maintains in data store 24 a number of objects for the different kinds of items with which a user may interact while accessing social networking system 20. In one example embodiment, these objects include user profiles, application objects, and message objects (such as for wall posts, emails and other messages). In one embodiment, an object is stored by the system 20 for each instance of its associated item. These objects and the actions discussed herein are provided for illustration purposes only, and it can be appreciated that an unlimited number of variations and features can be provided on a social networking system 20.

As described above, a web page or underlying structured document may be segmented or divided into sections logically, visually, or otherwise. By way of example, the structured document used to encode the web page may include one or more block-level elements denoted by starting and ending HTML <div> tags. By way of background, for common web browsers, displayable elements of a web page can be rendered as either block or inline. While all elements are part of the document sequence, block elements appear within their parent elements as rectangular objects, which do not break across lines, and with block margins, and width and height properties, which can be set independently of the surrounding elements. Conversely, inline elements are treated as part of the flow of document text; they cannot have margins, width or height set, and do break across lines. Inline elements cannot be placed directly inside the body element; they must be wholly nested within block-level elements.

As another example, a web page may also be split into one or more frames as structurally specified using HTML Frame elements (e.g., denoted by starting and ending tags <frame> and </frame>, respectively). Frames allow a web browser display window to be split into segments, each of which can show a different document. Another frame element is the inline frame element (denoting by starting and ending tags <iframe> and </iframe>, respectively). An inline frame places another HTML structured document in a frame. Unlike an object element, an inline frame can be the "target" frame for links defined by other elements.

Hereinafter, any logical, structural, or visual section or portion of a web page or the structured document used to encode the web page, such as a block-level element, frame, or inline frame, among others, may hereinafter each be referred to as a "pagelet."

When a user at a client device (e.g., client device 30) desires to view a particular web page (hereinafter also referred to as "target structured document") hosted, at least in part, by social networking system 20, the user's web browser, or other client-side document-rendering engine or suitable client application, formulates and transmits a request to social networking system 20. The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted.

Figure 2:
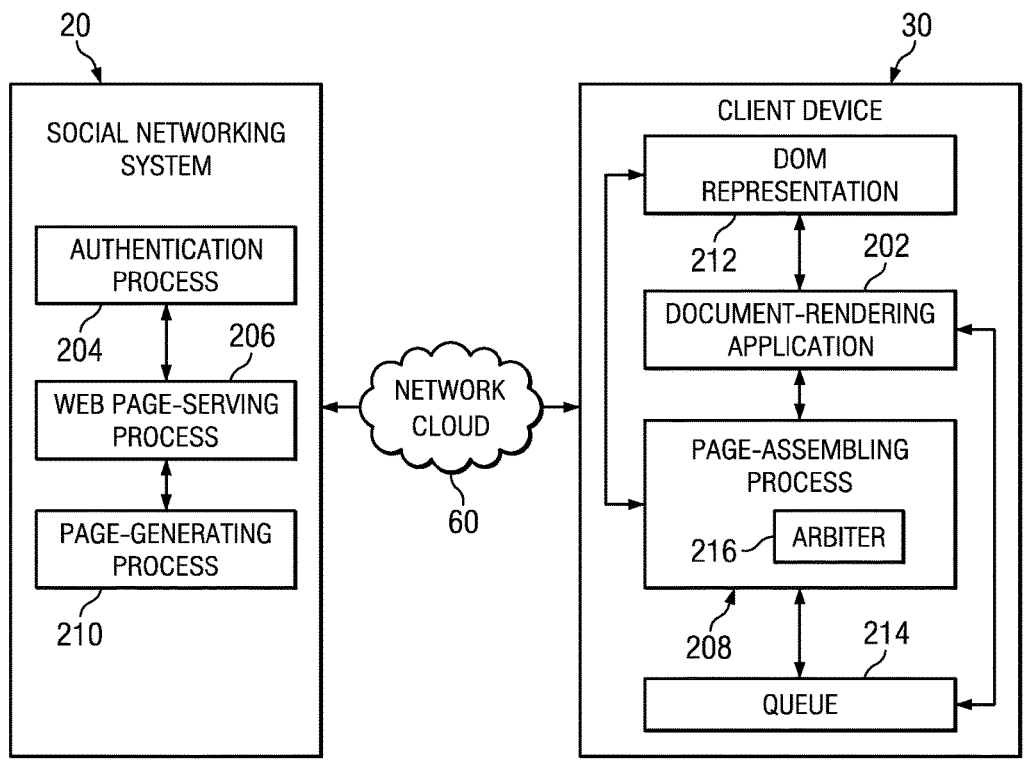
FIG. 2 illustrates a block diagram of example components of the example network environment of FIG. 1.
Figure 3:
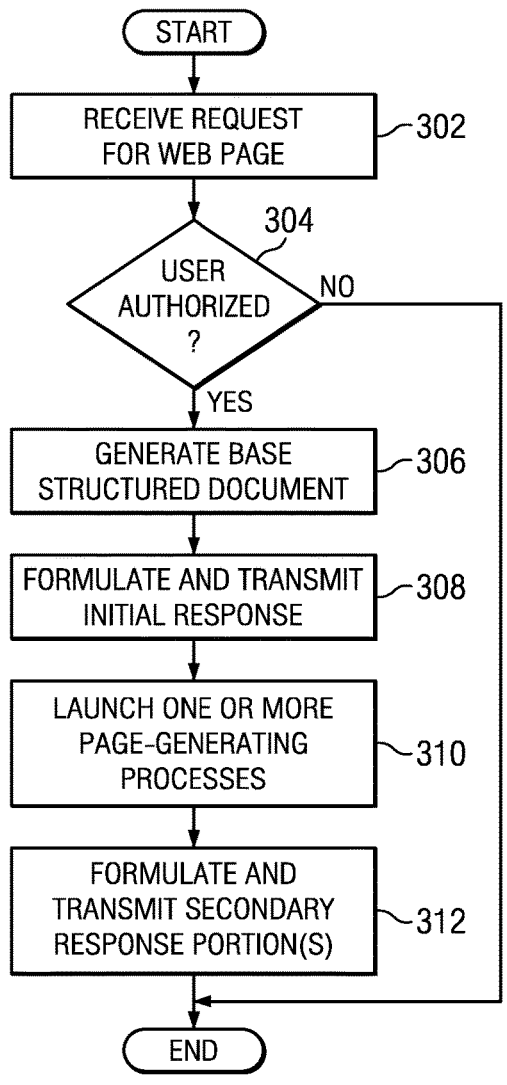
FIG. 3 shows a flowchart illustrating an example method for serving a request for a web page.

A method for serving a request for a web page will now be described with reference to the block diagram of FIG. 2 and the flowchart of FIG. 3. In an example embodiment, the method begins at 302 with receiving, by a server 22 or other computing system in social networking system 20, a request from a client application at a client device 30 for a web page hosted, at least in part, by social networking system 20. As described above, the request generally includes a URL or other document identifier corresponding to the web page location, as well as metadata or other information. By way of example, the request may include information identifying the user of the client application making the request, such as a user ID, as well as information identifying or characterizing the client-side document-rendering application (e.g., web browser) 202 or operating system running on the user's client computing device 30. The request may also include location information identifying a geographic location of the user's client device or a logical network location of the user's client device. The request may also include a timestamp identifying when the request was transmitted. An authentication process 204 may first determine, at 304, whether the user making the request is authorized to receive the requested web page (e.g., has the user successfully logged in and is the user requesting a page for which the user has access or administrative rights).

In particular embodiments, web page-serving process 206 then analyzes the request and generates, at 306, a base (skeletal) structured document using markup language code (e.g., HTML, XML, or other suitable markup language code). In particular embodiments, the base structured document includes a head element (e.g., an HTML head element) and a body element (e.g., an HTML body element). In particular embodiments, the head element includes an executable code segment for implementing a page-assembling process 208 at the requesting client 30. In particular embodiments, the executable code segment for implementing the page-assembling process 208 is a JavaScript code segment and includes a JavaScript function library. The head element may also include one or more initial resources (e.g., JavaScript or CSS) or references to such resources (e.g., in the form of script, image, or object elements having corresponding source (src) identifiers for locating the selected resources) to be downloaded from external locations (e.g., third party sites). In particular embodiments, it is desirable to minimize the number of initial resources included in the base structured document (e.g., to expedite the transmitting of the base structured document to the requesting client 30). In particular embodiments, the body element includes markup language code for rendering one or more placeholders once received by the requesting client 30. In particular embodiments, page-serving process 206 adds a placeholder into the base structured document for each of one or more (there are generally a plurality) pagelets to be transmitted to the client 30 in corresponding second responses, as will be described in more detail below. The body element may also include resources, references to resources, or even content to be rendered once received by the requesting client 30 (although, again, in particular embodiments the resources, reference to resources, or content are minimized in the base structured document). In particular embodiments, web page-serving process 206 then formulates and transmits an initial response or initial response portion (hereinafter also referred to as a "first response" or "first response portion") at 308 to the requesting client 30 that includes the base structured document (It should be noted that in some embodiments, some data such as, for example, pre-fetching instructions may be transmitted to the client prior to transmitting the initial/first response/response portion). The initial response may be transmitted to the requesting client 30 over an HTTP or any other suitable connection. In particular embodiments, the connection over which the initial response is transmitted to the client 30 is a persistent Transmission Control Protocol (TCP) connection. As will be described below, this enables the client 30 to receive, and to begin processing of, the base structured document and to initialize or download the resources in the initial response while the remainder of the requested web page is generated.

In particular embodiments, after, or even at least partially in parallel, with generating the base structured document at 306 or transmitting the initial response at 308, web page-serving process 206 launches, at 310, page-generating process 210 and instructs it to generate the remainder of the requested web page. In one particular embodiment, page-generating process 210 comprises a master process that administers a plurality of subpage-generating processes that are each configured to generate an assigned subportion of the webpage. That is, in particular embodiments, each of one or more subpage-generating processes begins generating an assigned pagelet in parallel with the other subpage-generating processes. In one particular embodiment, as each subpage-generating process completes the generation of its assigned pagelet, page-generating process 210 passes the pagelet to page-serving process 206, which then formulates and transmits the pagelet as a secondary response or secondary response portion (hereinafter also referred to as a "second response" or "second response portion") at 312 to the requesting client 30. In an alternate embodiment, page-serving process 206 may comprise page-generating process 210 and may generate each secondary portion sequentially in-process, which may generally not involve launching one or more other page-generating processes. It should be noted that, while described as a single step 312, step 312 may generally include the formulating and transmitting of a plurality of pagelets in a plurality of corresponding secondary responses sent in series or parallel to client 30, and in some embodiments, as each pagelet is generated. As described above, each secondary response may be transmitted to the client 30 over the same persistent TCP or other suitable connection over which the initial response was transmitted. In one embodiment, the body element of the base structured document may not be closed with an ending tag, and as such, each secondary response may be transmitted as a later-generated and later-transmitted part of the body element of the base structured document. In another embodiment, one or more of the secondary responses may be transmitted as one or more independent HTML responses.

In one embodiment, as described above, each of the secondary responses or secondary response portions (of which there may generally be a plurality) is formulated and transmitted when the corresponding pagelet is completed by page-generating process 210 (or subpage-generating process thereof). In one alternate embodiment, page-generating process 210 or page-serving process 206 may transmit the secondary responses in any suitable or preferred order. By way of example, page-serving process 206 may order the transmitting of the secondary responses based on their corresponding importance or relevance in the rendering of the webpage. However, it particular embodiments, as described below, the client-side page assembling process 208 may enforce a preferred order of the received pagelets and process each pagelet according to a number of factors or preferences.

In particular embodiments, when the requesting client 30, and particularly document-rendering application 202 (e.g., a web browser) receives the initial response, document-rendering application 202 processes the initial response and generates a model representation of the base structured document in memory at the client 30. By way of example, document-rendering application 202 may generate a Document Object Model (DOM) representation 212 of the base structured document. As will be appreciated by those of skill in the art, when document-rendering application 202 generates the DOM representation 212, it essentially translates the markup language code into a DOM tree or DOM hierarchy of DOM elements or nodes, each of which may include or contain resources, references for resources, content, among other possibilities. In particular embodiments, the base structured document is configured such that document-rendering application 202 generates one or more DOM nodes for each of the place-holders specified in the base structured document. Hereinafter, these DOM nodes may be referred to as "place-holder DOM nodes." Generally, each place-holder DOM node doesn't include any resources, references for resources, or content to be displayed, however, these place-holder DOM nodes, when rendered by document-rendering application 202 and generally displayed essentially reserve places in the rendered base structured document in which subsequently received resources, references for resources, or content in associated pagelets in subsequently received secondary responses will be displayed, initialized, or executed, as will be described in more detail below.

In particular embodiments, the code segment (e.g., JavaScript) for implementing page-assembling process 208 is initialized upon being processed by document-rendering application 202. Upon being initialized, page assembling process 208 may then wait for subsequently received secondary responses described above. Any other resources, or references to resources, included in the initial response may also be processed, initialized, executed, or downloaded upon being received by document-rendering application 202.

In particular embodiments, as each of the secondary response are received by document-rendering application 202, page-assembling process 208 may place the contents of each corresponding pagelet in queue 214 (which may be implemented in a temporary or other suitable memory location accessible by page-assembling process 208 or document-rendering application 202). Subsequently, page-assembling process 208 may, for each received secondary response, identify a corresponding place-holder DOM node (or nodes) in the DOM representation 212 and dynamically insert or swap the contents of the pagelet into the DOM representation 212 at or in place of the corresponding place place-holder DOM node. In particular embodiments, the page-assembling process 208 may dynamically insert or swap the contents of the pagelet into the DOM representation 212 in conjunction with the document-rendering application 202; that is, the document-rendering application 202 may actually insert or swap the contents in response to a call from page-assembling process 208. It should be noted that this insertion or swapping may involve the generation of additional DOM nodes in the DOM representation 212 (e.g., the generation of lower order DOM nodes in the DOM representation 212 at or below the level of the place-holder DOM node corresponding to the pagelet). As the contents of each secondary response is inserted into the DOM representation 212, the content or resources inserted may then be rendered, executed, initialized, or downloaded for rendering by document-rendering application 202 and displayed to the user.

In particular embodiments, each pagelet includes, or is in the format of, a function call that is configured to call page-assembling process 208 once received by the client 30. In particular embodiments, page-assembling process 208 includes a function library (e.g., a JavaScript function library) that includes (e.g., JavaScript) functions that are to be, or may be, called by function calls in the subsequently received secondary responses. In particular embodiments, each pagelet includes some markup language code (e.g., HTML) including a script for implementing the corresponding function call and that identifies the functions required by the function library of page-assembling process 208. In particular embodiments, each function call includes one or more arguments wrapped in one or more callback functions including, by way of example, HTML or other markup language code, an array of JavaScript resources, an array of CSS resources, and a register that includes a list of (e.g., JavaScript) scripts or code segments to be executed after the pagelet is displayed and the resources identified in the pagelet are downloaded.

In particular embodiments, each function call further includes some metadata describing some properties of the pagelet and that may be used by page-assembling process 208 to determine a relative priority of the pagelet. This enables page-assembling process 208 to schedule a relative display order of each of the pagelets received in the secondary responses. By way of example, some pagelets may enable features that are predetermined to not be critical, or not as critical as other features or content, and as such, these pagelets may be rendered after other more critical pagelets. In one simple implementation, each function call further includes a "delay flag." When this delay flag is set to true, this instructs page-assembling process 208 that the pagelet is not relatively critical and its insertion into the DOM representation 212 and subsequent rendering by document-rendering application 202 may be delayed until other higher priority pagelets are inserted and rendered. More particularly, and as will be described in more detail below, each pagelet callback function, when received at the client 30, may be held in queue 214 until other higher priority pagelet callback functions are processed or executed. However, in some embodiments, if there are no higher priority pagelets in queue 212, a lesser priority pagelet callback function may be processed.

In particular embodiments, as described above, to insert the contents of a particular pagelet received in a secondary response into the DOM representation 212, page-assembling process 208 must identify the corresponding place-holder DOM node in the DOM representation 212. In particular embodiments, this is achieved by including, by page-serving process 206, an identifier (ID) parameter with each place-holder in the base structured document. Similarly, each pagelet generated by page-generating process 210 includes an ID parameter usable by page-assembling process 208 to identify the matching or corresponding place-holder DOM node in the DOM representation 212 into which, or at which, the contents of the pagelet are to be inserted or swapped.

Figure 4:
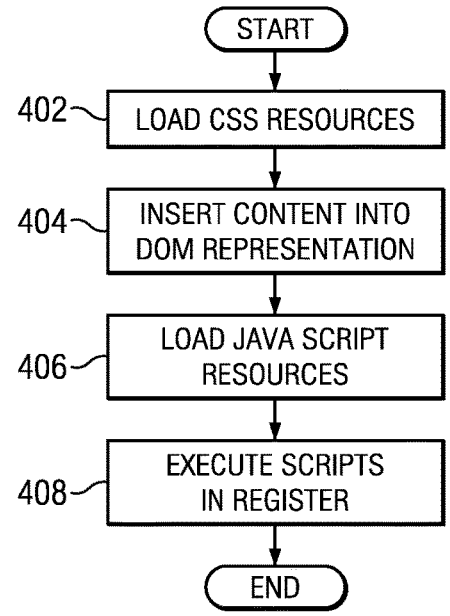
FIG. 4 shows a flowchart illustrating an example method for executing a pagelet callback function.

A method for executing a pagelet callback function will now be described with reference to the flowchart of FIG. 4. In particular embodiments, when a pagelet is received in a secondary response, the corresponding function call calls page-assembling process 208 at 402. Page-assembling process 208 then puts the corresponding pagelet callback function in queue 214, which may already contain pagelet callback functions corresponding to previously received pagelets received in previous secondary responses. Here it should be noted that, in particular embodiments, each pagelet callback function may generally include a plurality of callback functions, each configured to or responsible for completing a particular task (e.g., downloading CSS resources, rendering HTML, or downloading and executing JavaScript resources). However, in one particular embodiment, the plurality of callback functions received in a given secondary response are wrapped in an overlying callback function hereinafter referred to as the pagelet callback function that must be called before each callback function wrapped within the pagelet callback function is called. Additionally or alternately, page-assembling process 208 itself may generate, when the pagelet is received at the client or when the pagelet's pagelet callback function is called (or other suitable time), one or more callback functions for each pagelet that are configured to complete a respective task. Generally, sometime later when the pagelet callback function is up in queue 214, page-assembling process 208 processes or executes the pagelet callback function (which, as just described, may include processing or executing other callback functions within the pagelet callback function that are each responsible for one or more of the following steps) including, for example, dynamically loading, at 402, the CSS resources (e.g., setting the string of CSS parameters) included in the pagelet, identifying the corresponding place-holder DOM node in the DOM representation 212 and inserting (or causing document-rendering application 202 to insert) the pagelet content into the corresponding place-holder DOM node at 404 (e.g., translating, or causing the document-rendering application 202 to translate, the HTML or other markup language code into the DOM representation 212 at or in place of the corresponding place-holder DOM node), dynamically loading, at 406, the JavaScript or other resources included in the pagelet that call particular functions in the function library of page-assembling process 208, and executing, at 408, the scripts or other code segments identified in the register. Additionally, any resources that are required to be downloaded for a pagelet may be downloaded and then initialized by, for example, page-assembling process 208. Various event handling and event messaging systems or mechanisms may be used to trigger such inter- and intra-callback function operations, particular examples of which will be described in more detail below with reference to FIG. 5.

In one particular embodiment, page-serving process 206 or page-generating process 210 assigns a priority to each pagelet and includes this priority information as, for example, a "phase" parameter or property in the pagelet's callback function. By way of example, in one implementation, pagelets may be assigned one of three possible phase (priority) parameter values: phase 1 (high priority), phase 2 (medium priority), or phase 3 (low priority). This phase information may then be used by page-assembling process 208 to enforce a preferred order of processing the pagelet callback functions corresponding to the pagelets in queue 214. As described above, when each secondary response is received at the client 30, the pagelet's function call calls page-assembling process 208, which then puts the pagelet, and particularly the corresponding pagelet callback function, in queue 214. However, in particular embodiments, page-assembling process 208 only processes or executes (e.g., loading CSS resources, translating HTML, and loading, initializing, or executing JavaScript or other resources or code segments) callback functions corresponding to pagelets of a given phase parameter value at a time; that is, in the above example, page-assembling process 208 doesn't execute the callback functions of pagelets of phase 3 until the callback functions of pagelets of phase 2 are executed and, similarly, the callback functions of pagelets of phase 2 aren't executed until the pagelets of phase 1 are executed. In one example, page-serving process 206 transmits all the secondary responses that include pagelets of phase 1 before transmitting any secondary responses that include pagelets of phase 2, and similarly, transmits all the secondary responses that include pagelets of phase 2 before transmitting any secondary responses that include pagelets of phase 3. However, to minimize the time required to render the requested web page at the client 30, in particular embodiments, the secondary responses are formulated and transmitted as soon as their respective pagelets are generated by page-generating process 210 as described with reference to particular embodiments above. To facilitate the proper or preferred ordering of execution in such embodiments, page-serving process 206 may transmit with the initial response (or subsequently), information that informs page-assembling process 208 of the number of pagelets of each phase. By way of example, in one particular implementation, the total number of phases is transmitted with the initial response and each pagelet transmitted in a respective secondary response includes a "is_last" flag that, when set to true, informs page-assembling process 208 that the respective pagelet is the last pagelet of that particular phase. In yet another alternate embodiment, all the pagelets may be transmitted to the client 30 in a single secondary response.

Thus, generally, and conceptually, to enforce a preferred order of rendering/displaying by document-rendering application 202, when a pagelet callback function is up in the queue 214 for execution, page-assembling process 208 may first check the pagelet's priority; that is, inspects the pagelet's associated phase value, and then determine whether there are any other pagelets of higher phase value. If there are, page-assembling process 208 executes the callback functions of the higher phase pagelets first. If there are no other pagelets having a higher phase value, the pagelet at the top of the queue 214 is processed. However, in order to not unnecessarily prolong the page-assembling process, even if all of the callback functions of higher phase pagelets are not executed because they have not yet been received by the client 30, callback functions in queue 214 associated with lower phase pagelets may be executed.

Figure 5:
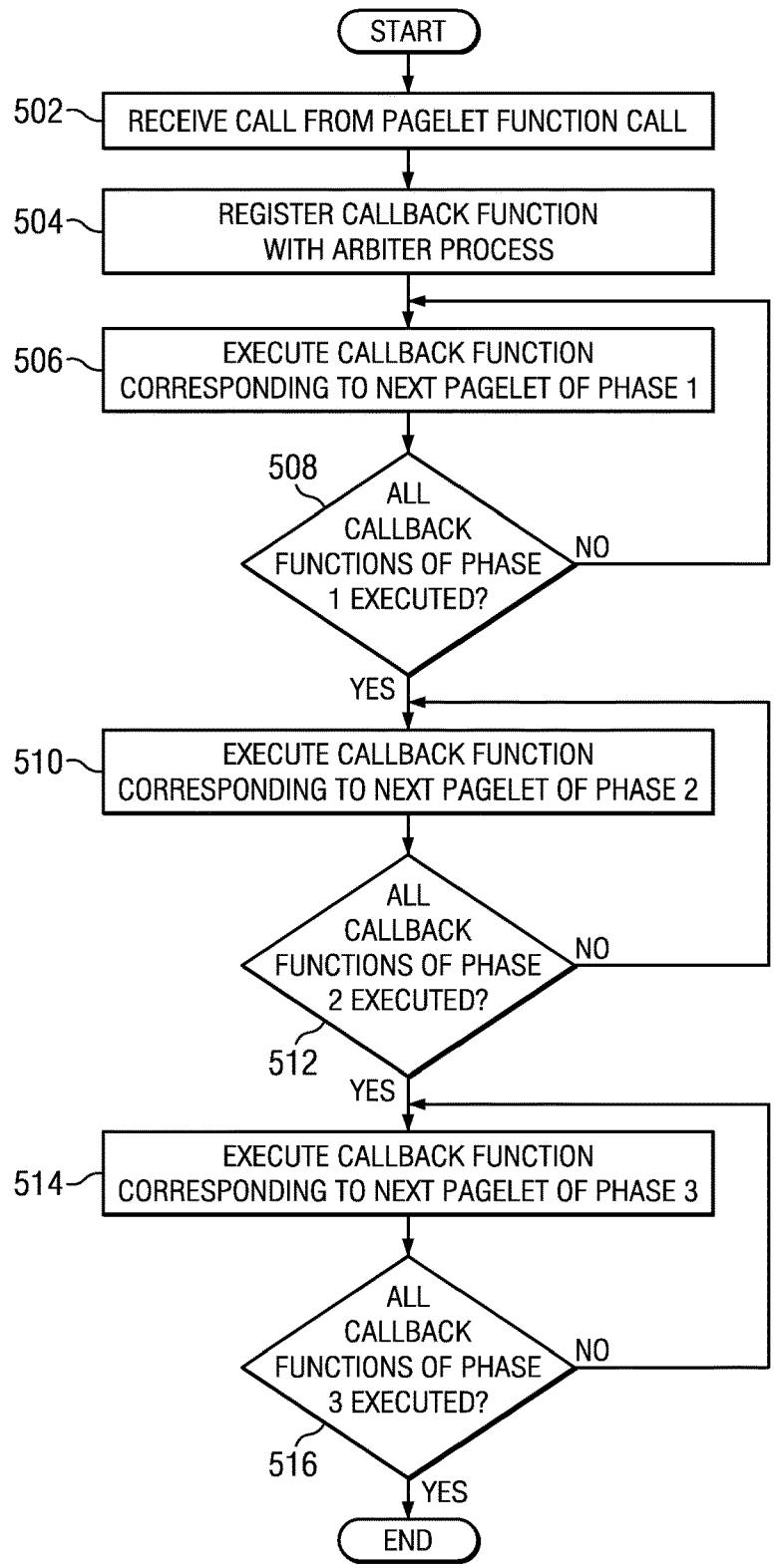
FIG. 5 shows a flowchart illustrating an example method for enforcing an order of executing pagelet callback functions.

A more detailed description of an example implementation of the page-assembling method executed by page-assembling process 208 will now be described with reference to the flowchart illustrated in FIG. 5. In one particular embodiment, page-assembling process 208 includes a sub arbiter process 216. Arbiter process 216 effectively implements a publish/subscribe system for ordering the processing of pagelet callback functions (inter-callback) as well as the ordering of the processing within each callback function (intra-callback). In particular embodiments, when page-assembling process 208 receives, at 502, a call from a function call associated with a pagelet received in a secondary response, it registers, at 504, the pagelet's callback function with arbiter process 216 effectively registering the callback function as a subscriber for a set of conditions (e.g., completion of particular events) that must be satisfied before executing the callback function. In registering a pagelet callback function with arbiter process 216, arbiter process 216 is informed of the associated phase parameter value assigned to the pagelet, which arbiter process 216 then uses to determine what conditions need to be satisfied before processing (executing) the callback function. Additionally, in particular embodiments, each process or corresponding function (or callback function) involved with executing the pagelet callback function (e.g., loading CSS resources, inserting HTML markup language code into DOM representation 212, loading, initializing, downloading, or executing JavaScript resources, code segments or scripts) is also registered with arbiter process 216 at 504. That is, each pagelet callback function may include callback functions for executing the individual processes required to execute the overlying pagelet callback function (e.g., a callback function for loading CSS resources, a callback function for inserting HTML markup language code into the DOM representation 212, callback functions for loading, initializing, downloading, or executing the JavaScript resources, code segments, or scripts, etc.). As described above, these individual or sub-pagelet callback functions may be wrapped within a pagelet callback function by page-serving process 206 or page-generating process 210 or, additionally or alternately, may be generated by page-assembling process 208 itself after receiving the respective pagelet callback function.

In particular embodiments, at some point after receiving a first call from a first received function call corresponding to a first received pagelet received in a first secondary response, page-assembling process 208 then executes, at 506, the callback function corresponding to the first received pagelet having a phase parameter value of 1. As described above with reference to FIG. 4, executing the callback function at 506 may first involve calling a function that dynamically loads the CSS resources included in the pagelet callback function arguments (step 402 in FIG. 4). When the CSS resources are loaded, a "CSS resource loading done" signal may then be sent to arbiter 216. Upon receipt of the CSS resource loading done signal, a function for inserting (or causing document-rendering application 202 to insert) the pagelet content into the corresponding place-holder DOM node (step 404 in FIG. 4) is called by arbiter process 216. Upon completion of the insertion of the content, a "content insertion done" signal may then be sent to arbiter process 216. Upon receipt of the content insertion done signal, a function for dynamically loading the JavaScript or other resources included in the pagelet that call particular functions in the function library of page-assembling process 208 (step 406 in FIG. 4) may then be called by arbiter process 216. Upon completion of the loading of the JavaScript resources that call particular functions in the function library of page-assembling process 208, a "JavaScript loading done" signal may then be sent to arbiter process 216. Upon receipt of the JavaScript loading done signal, a function for executing the scripts or other code segments identified in the register of the pagelet callback function (step 408 of FIG. 4) may then be called by arbiter process 216. Upon completion of the execution of the scripts or other code segments in the register, a "register execution done" signal may then be sent to arbiter process 216. Upon receipt of the register execution done signal, arbiter process 216 then determines, at 508, whether or not all the callback functions associated with pagelets of phase 1 have been executed. If not, the method proceeds back to 506 with executing the next callback function corresponding to a pagelet of phase 1. If all of the callback functions associated with pagelets of phase 1 have been executed, a "phase 1 done" signal is sent to arbiter process 216.

In an example implementation, in response to the "phase 1 done" signal, arbiter process 216 then calls the callback function associated with the next pagelet of phase 2, which then gets executed at 510 as described above. Arbiter process 216 then determines, at 512, whether or not all the callback functions associated with pagelets of phase 2 have been executed. If not, the method proceeds back to 510 with executing the next callback function corresponding to a pagelet of phase 2. If all of the callback functions associated with pagelets of phase 2 have been executed, a "phase 2 done" signal is sent to arbiter process 216. Similarly, in an example, implementation, arbiter process 216 then calls the callback function associated with the next pagelet of phase 3, which then gets executed at 514 as described above. Arbiter process 216 then determines, at 516, whether or not all the callback functions associated with pagelets of phase 3 have been executed. If not, the method proceeds back to 514 with executing the next callback function corresponding to a pagelet of phase 3. If all of the callback functions associated with pagelets of phase 3 have been executed, a "phase 3 done" signal is sent to arbiter process 216.

It should be noted that, in particular alternate embodiments, callback functions associated with pagelets of the same phase may be executed in parallel. More particularly, to exploit parallelism among pagelets, the execution of pagelets with the same phase/priority may be highly parallelized. For example, if pagelet A and pagelet B have the same priority, the CSS resources for each of pagelet A and pagelet B may both be downloaded at least partially simultaneously (e.g., the CSS resources for pagelet A may be begin loading simultaneously or concurrently with the loading of the CSS resources for pagelet B) and thereafter have their respective content displayed without waiting for the other pagelet's (pagelet A or pagelet B) operations. However, continuing this example, if a pagelet C has lower priority than pagelets A and B, the execution of pagelet C (or particularly the callback function of pagelet C) may not be executed until both pagelet A and pagelet B have been executed (e.g., rendered and displayed).

Additionally, in particular embodiments, the downloading or execution of JavaScript resources or code segments is not done in phases; that is, in particular embodiments, the JavaScript resources of all the pagelets are not downloaded or executed until the rest of the functions or callback functions within the pagelet callback functions have executed. In other words, the display of the pagelets may be phased, but the downloading or execution of JavaScript may be done in one batch. By way of example, in one implementation, the flow may be as follows: download CSS resources for pagelets of phase 1, display pagelets of phase 1, download CSS resources for pagelets of phase 2, display pagelets of phase 2, download CSS resources for pagelets of phase 3, display pagelets of phase 3, download JavaScripts resources for all pagelets, and execute JavaScript resources for all pagelets (in such an implementation, in each phase, a pagelet's display may only wait for its own CSS resources to be downloaded, but not for other pagelets' CSS resources to be downloaded). That is, in particular embodiments, it is only the individual sub-pagelet callback functions responsible for downloading CSS resources and rendering HTML that govern (or wait for) the phase 1, 2, or 3 done signals. In contrast, in particular embodiments, the downloading and execution of JavaScripts may only be performed after all the pagelets are displayed (e.g., after the CSS resources for all the pagelets are downloaded and the HTML for all the pagelets is rendered).

As described herein, any of the described processes or methods can be implemented as a series of computer-readable instructions, embodied or encoded on or within a tangible data storage medium, that when executed are operable to cause one or more processors to implement the operations described above. For smaller datasets, the operations described above can be executed on a single computing platform or node. By way of example, in particular embodiments, the phased generation processes described above with reference to FIGS. 2 and 3 may be implemented by a single server process executing in server 22. That is, the web page generation and serving processes described above may be implemented on server 22. For larger systems and resulting data sets, parallel computing platforms can be used.

FIG. 1 illustrates an example distributed computing system, consisting of one master server 22a and two slave servers 22b. In some embodiments, the distributed computing system comprises a high-availability cluster of commodity servers in which the slave servers are typically called nodes. Though only two nodes are shown in FIG. 1, the number of nodes might well exceed a hundred, or even a thousand or more, in some embodiments. Ordinarily, nodes in a high-availability cluster are redundant, so that if one node crashes while performing a particular application, the cluster software can restart the application on one or more other nodes.

Multiple nodes also facilitate the parallel processing of large databases. In some embodiments, a master server, such as 22a, receives a job from a client and then assigns tasks resulting from that job to slave servers or nodes, such as servers 22b, which do the actual work of executing the assigned tasks upon instruction from the master and which move data between tasks. In some embodiments, the client jobs will invoke Hadoop's MapReduce functionality, as discussed above.

Likewise, in some embodiments, a master server, such as server 22a, governs a distributed file system that supports parallel processing of large databases. In particular, the master server 22a manages the file system's namespace and block mapping to nodes, as well as client access to files, which are actually stored on slave servers or nodes, such as servers 22b. In turn, in some embodiments, the slave servers do the actual work of executing read and write requests from clients and perform block creation, deletion, and replication upon instruction from the master server.

While the foregoing processes and mechanisms can be implemented by a wide variety of physical systems and in a wide variety of network and computing environments, the server or computing systems described below provide example computing system architectures for didactic, rather than limiting, purposes.

Figure 6:
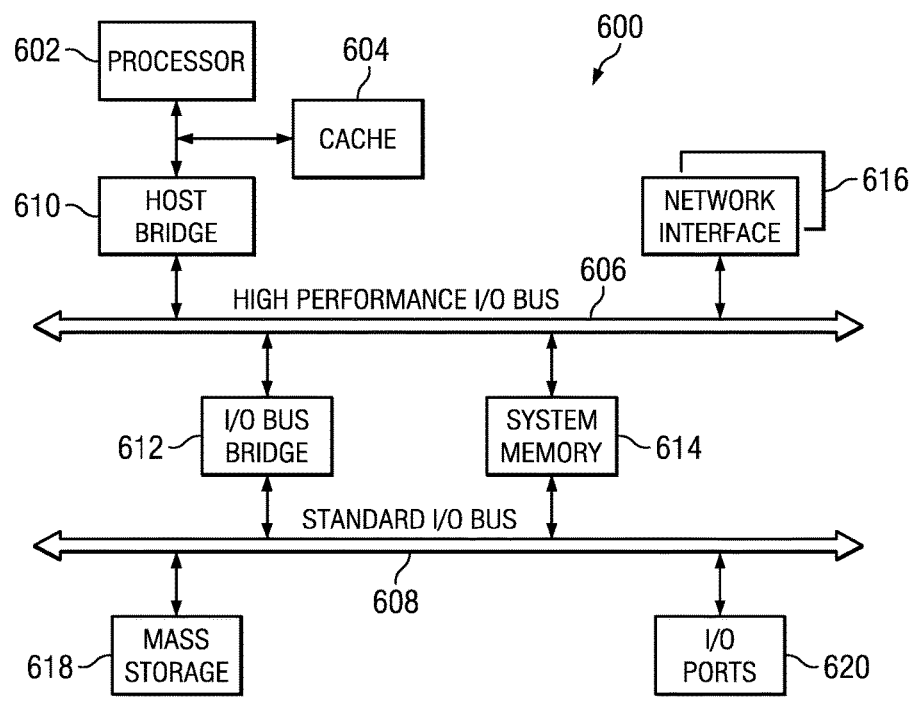
FIG. 6 illustrates an example computer system architecture.

FIG. 6 illustrates an example computing system architecture, which may be used to implement a server 22a, 22b, or a client device 30. In one embodiment, hardware system 600 comprises a processor 602, a cache memory 604, and one or more executable modules and drivers, stored on a tangible computer readable medium, directed to the functions described herein. Additionally, hardware system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network/communication interfaces 616 couple to bus 606. Hardware system 600 may further include video memory (not shown) and a display device coupled to the video memory. Mass storage 618, and I/O ports 620 couple to bus 608. Hardware system 600 may optionally include a keyboard and pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, a backplane, etc. Mass storage 618 provides permanent storage for the data and programming instructions to perform the above-described functions implemented in the servers 22a, 22b, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures; and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present invention may not require nor include all of the above components. For example, the peripheral devices shown coupled to standard I/O bus 508 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

In one implementation, the operations of the embodiments described herein are implemented as a series of executable modules run by hardware system 600, individually or collectively in a distributed computing environment. In a particular embodiment, a set of software modules and/or drivers implements a network communications protocol stack, parallel computing functions, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 602. Initially, the series of instructions may be stored on a storage device, such as mass storage 618. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 616. The instructions are copied from the storage device, such as mass storage 618, into memory 614 and then accessed and executed by processor 602.

An operating system manages and controls the operation of hardware system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present disclosure have been described as operating in connection with a social networking website, various embodiments of the present invention can be used in connection with any communications facility that supports web applications. Furthermore, in some embodiments the term "web service" and "web site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A method comprising:
   receiving, by a computing server machine, a request for a web page;
   sending, by the computing server machine, a first response portion for generating the requested web page to a client computing device in response to the request, the first response portion comprising a structured document for use by the client computing device to render the requested web page, the structured document comprising:
   markup-language code that comprises one or more place-holder code segments; and
   an executable code segment for implementing a page-assembling process;
   generating, by the computing server machine, one or more second response portions each for generating a corresponding portion of the requested web page, each second response portion comprising markup-language code comprising a call to a function of the page-assembling process;
   determining, for each second generated second response portion, a relative priority;
   sending, by the computing server machine, each of the second response portions to the client computing device in an order based on the determined relative priorities of the respective second response portions, wherein each second response portion is configured to be inserted at a location determined by a corresponding one of the place-holder code segments of the structured document; and
   wherein the page-assembling process is configured to, for each second response portion:
   identify a place-holder identification (ID) parameter in the respective call to the function;
   access a model representation of the structured document, wherein the model representation comprises one or more place-holder code segments, each place-holder code segment having a corresponding place-holder ID parameter;
   identify a particular place-holder segment in the model representation by matching the place-holder ID parameter in the respective call to the function to a place-holder segment having a matching place-holder ID parameter; and
   insert, or cause to be inserted, at the respective location determined by the particular place-holder code segment, the second response portion into the model representation of the structured document generated by a client rendering application.

2. The method of claim 1, wherein the structured document further comprises one or more first resources or one or more first references to first resources.

3. The method of claim 1, wherein the one or more second response portions further comprise one or more of:
   one or more second portions of content to be rendered by the client computing device, one or more second resources, or one or more second references to second resources to be downloaded.

4. The method of claim 1, wherein the page-assembling process is implemented at the client computing device.

5. The method of claim 1, wherein generating each of the one or more second response portions comprises causing each of a plurality of page-generating processes to generate the markup-language code, one or more second portions of content, one or more second resources, or one or more second references to second resources, and the call to the function in a corresponding second response portion at least partially in parallel.

6. The method of claim 5, wherein each of the one or more second response portions are sent to the client computing device upon completion of the generating of the markup language code, one or more second portions of content, one or more second resources, or one or more second references to second resources, and the call to the function in the respective second response portion.

7. The method of claim 1, wherein the page-assembling process is further configured to:
determine whether one or more conditions that must be satisfied before executing the call to the function have been met.

8. The method of claim 1, wherein after each of the one or more second response portions are received by the client computing device, the call to the function of each second response portion is configured to call the page-assembling process.

9. The method of claim 1, wherein each second response portion comprises an identifier parameter that is usable by the page-assembling process to identify the corresponding place-holder code segment in the structured document.

10. The method of claim 1, wherein when the first response portion is received by the client computing device, the first response portion is configured to cause the client rendering application executing in the client computing device to generate the model representation of the structured document for rendering the structured document, and to begin downloading or executing one or more first resources or one or more first references to first resources.

11. The method of claim 1, wherein each place-holder code segment is represented as a place-holder node in the model representation.

12. The method of claim 1, wherein each second response portion comprises a callback function that comprises the markup language code, one or more second portions of content, one or more second resources, or one or more second references to second resources.

13. The method of claim 12, wherein the page-assembling process executes the callback functions of the second response portions each having a highest priority parameter value before executing callback functions of the second response portions not having the highest priority parameter value.

14. A computing server machine comprising:
one or more processors; and
a memory coupled to the processors comprising instructions executable by the processors, the processors being operable when executing the instructions to:
receive a request for a web page;
send a first response portion for generating the requested web page to a client computing device in response to the request, the first response portion comprising a structured document for use by the client computing device to render the requested web page, the structured document comprising:
markup-language code that comprises one or more place-holder code segments; and
an executable code segment for implementing a page-assembling process;
generate one or more second response portions each for generating a corresponding portion of the requested web page, each second response portion comprising markup-language code comprising a call to a function of the page-assembling process;
determine, for each second generated second response portion, a relative priority;
send each of the second response portions to the client computing device in an order based on the determined relative priorities of the respective second response portions, wherein each second response portion is configured to be inserted at a location determined by a corresponding one of the place-holder code segments of the structured document; and
wherein the page-assembling process is configured to, for each second response portion:
identify a place-holder identification (ID) parameter in the respective call to the function;
access a model representation of the structured document, wherein the model representation comprises one or more place-holder code segments, each place-holder code segment having a corresponding place-holder ID parameter;
identify a particular place-holder segment in the model representation by matching the place-holder ID parameter in the respective call to the function to a place-holder segment having a matching place-holder ID parameter; and
insert, or cause to be inserted, at the respective location determined by the particular place-holder code segment, the second response portion into the model representation of the structured document generated by a client rendering application.

15. The computing server machine of claim 14, wherein the structured document further comprises one or more first resources or one or more first references to first resources.

16. The computing server machine of claim 14, wherein the one or more second response portions further comprise one or more of:
one or more second portions of content to be rendered by the client computing device, one or more second resources, or one or more second references to second resources to be downloaded.

17. The computing server machine of claim 14, wherein the processors being operable when executing the instructions to generate each of the one or more second response portions comprises the processors being operable when executing the instructions to:
cause each of a plurality of page-generating processes to generate the markup language code, one or more second portions of content, one or more second resources, or one or more second references to second resources, and the call to the function in a corresponding second response portion at least partially in parallel.

18. The computing server machine of claim 17, wherein each of the one or more second response portions are sent to the client computing device upon completion of the generating of the markup language code, one or more second portions of content, one or more second resources, or one or more second references to second resources, and the call to the function in the respective second response portion.

19. One or more computer-readable non-transitory storage media embodying software that is operable when executed to:
- receive, by a computing server machine, a request for a web page;
- send, by the computing server machine, a first response portion for generating the requested web page to a client computing device in response to the request, the first response portion comprising a structured document for use by the client computing device to render the requested web page, the structured document comprising:
  - markup-language code that comprises one or more place-holder code segments;
  - an executable code segment for implementing a page-assembling process;
- generate, by the computing server machine, one or more second response portions each for generating a corresponding portion of the requested web page, each second response portion comprising markup-language code comprising a call to a function of the page-assembling process;
- determine, for each second generated second response portion, a relative priority
- send, by the computing server machine, each of the second response portions to the client computing device in an order based on the determined relative priorities of the respective second response portions, wherein each second response portion is configured to be inserted at a location determined by a corresponding one of the place-holder code segments of the structured document; and
- wherein the page-assembling process is configured to, for each second response portion:
  - identify a place-holder identification (ID) parameter in the respective call to the function;
  - access a model representation of the structured document, wherein the model representation comprises one or more place-holder code segments, each place-holder code segment having a corresponding place-holder ID parameter;
  - identify a particular place-holder segment in the model representation by matching the place-holder ID parameter in the respective call to the function to a place-holder segment having a matching place-holder ID parameter; and
  - insert, or cause to be inserted, at the respective location determined by the particular place-holder code segment, the second response portion into the model representation of the structured document generated by a client rendering application.

20. The media of claim 19, wherein the one or more second response portions further comprise one or more of:
- one or more second portions of content to be rendered by the client computing device, one or more second resources, or one or more second references to second resources to be downloaded.

* * * * *